(12) United States Patent
Kowalk

(10) Patent No.: US 9,475,466 B2
(45) Date of Patent: Oct. 25, 2016

(54) NAVIGATION-LINKED VEHICLE DE-ICER OR DEBRIS-REMOVER CONTROL

(71) Applicant: Toyota Motor Engineering & Manufacturing North America, Inc., Erlanger, KY (US)

(72) Inventor: Christopher L. Kowalk, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 72 days.

(21) Appl. No.: 14/619,711

(22) Filed: Feb. 11, 2015

(65) Prior Publication Data
US 2016/0229378 A1    Aug. 11, 2016

(51) Int. Cl.
*G06F 7/00* (2006.01)
*B60S 1/68* (2006.01)
*G01C 21/34* (2006.01)

(52) U.S. Cl.
CPC .......... *B60S 1/68* (2013.01); *G01C 21/34* (2013.01)

(58) Field of Classification Search
None
See application file for complete search history.

(56) References Cited

U.S. PATENT DOCUMENTS

| | | |
|---|---|---|
| 5,573,686 A | 11/1996 | Lavicska |
| 6,021,843 A | 2/2000 | Roach |
| 2003/0141289 A1 | 7/2003 | Fisher |
| 2007/0044825 A1 | 3/2007 | Dalessandro |
| 2008/0083719 A1 | 4/2008 | Bartucco |
| 2008/0296279 A1* | 12/2008 | Forrest ............... B62D 25/16  219/202 |
| 2013/0018546 A1* | 1/2013 | Zimmer ............... B60S 1/0896  701/36 |
| 2013/0046428 A1* | 2/2013 | Jordan ................. B60L 1/06  701/22 |
| 2013/0283647 A1 | 10/2013 | Borges et al. |

OTHER PUBLICATIONS

Kowalk, "Location-Specific Detection and Removal of Ice or Debris in a Vehicle Wheel Well" U.S. Appl. No. 14/619,234, filed Feb. 11, 2015.

* cited by examiner

*Primary Examiner* — Yonel Beaulieu
*Assistant Examiner* — Lail Kleinman
(74) *Attorney, Agent, or Firm* — Christopher G. Darrow; Darrow Mustafa PC

(57) ABSTRACT

Systems and methods for automatically removing snow and/or ice from a portion of a vehicle exterior surface are provided. The automatic removal is in response to a determined driving distance or driving time to a destination. The systems include a vehicle navigation unit in communication with a snow removal element. When the navigation unit determines that the current driving distance or driving time to a destination is less than a pre-determined activation point, the frozen precipitate removal element is activated. The systems and methods of the present disclosure can have the benefit of removing snow or ice from a vehicle exterior surface before the vehicle arrives at a destination such as a storage garage, thereby minimizing the deposition of snow or ice at the destination.

21 Claims, 4 Drawing Sheets

NAVIGATION-LINKED VEHICLE DE-ICER OR DEBRIS-REMOVER CONTROL

TECHNICAL FIELD

The present disclosure relates in general to a system for activating and/or deactivating de-icers or debris removers on a vehicle in response to navigational or geographic position.

BACKGROUND

Frozen precipitate, such as ice or snow, or other debris such as dirt can accumulate on exterior surfaces of vehicles when such vehicles are operated in freezing or dirty conditions. In the case of an automobile, frozen precipitate frequently accumulates in the wheel wells or other areas of the vehicle undercarriage. In such cases, this accumulated frozen precipitate is likely to be deposited in a thaw-temperature parking area, such as a garage, after the vehicle is parked there. This deposited material, commonly laden with dirt, salt and other debris can lead to wetness, dirtiness, and potentially damage in the thaw-temperature parking area.

A system which can remove such frozen precipitate or debris from a vehicle exterior surface, such as a wheel well or other undercarriage portion, prior to the vehicle's arrival at the parking area can minimize these issues. In particular, a system which can automatically activate at a pre-determined interval prior to arrival at the parking area can achieve this goal with maximum convenience and efficiency.

SUMMARY

The present disclosure provides systems and methods for removing frozen precipitate from the undercarriage of a vehicle in response to geographic location.

In one aspect, a system for removing frozen precipitate or debris from a vehicle exterior surface is provided. The system includes a navigation unit configured to calculate a current destination arrival interval of the vehicle, such as a current distance or time to the destination. The system also includes a removal element configured to remove accumulated frozen precipitate from at least a portion of the undercarriage. The removal element is in communication with the navigation unit and is automatically activated when the current destination arrival interval is less than a pre-determined activation point. In some instances, the vehicle exterior surface is a vehicle undercarriage or a portion thereof.

In another aspect, a method for removing accumulated frozen precipitate from a vehicle exterior surface is provided. The method includes a step of determining a current destination arrival interval of the vehicle. The method further includes a step of activating a frozen precipitate removal element when the measured current destination arrival interval is less than a pre-determined activation point. In some implementations, the current destination arrival interval can be a current driving distance to the destination and the pre-determined activation point can be a pre-determined activation distance. In other implementations, the current destination arrival interval can be a current driving time to the destination and the pre-determined activation point can be a pre-determined activation time. In some versions of the method, the vehicle exterior surface is a vehicle undercarriage or a portion thereof.

In still another aspect, a system for removing frozen precipitate from a vehicle exterior surface is provided. The system includes a removal element and a controller. The removal element is configured to remove accumulated frozen precipitate from a portion of the vehicle undercarriage. The controller is configured to receive data from a navigation unit, the data pertaining to a current destination arrival interval. The controller is also configured to determine whether the current destination arrival interval is less than a pre-determined activation point. The controller is further configured to transmit instructions directing activation of the removal element if the current destination arrival interval is less than the pre-determined activation point. In some instances, the vehicle exterior surface is a vehicle undercarriage or a portion thereof.

BRIEF DESCRIPTION OF THE DRAWINGS

Various aspects and advantages of the disclosure will become apparent and more readily appreciated from the following description of the various aspects taken in conjunction with the accompanying drawings, of which.

DETAILED DESCRIPTION

The present disclosure contains subject matter similar to that of co-pending U.S. patent application Ser. No. 14/619,234, filed on the same day and assigned to the same entity, and that is hereby incorporated by reference in its entirety.

The present disclosure describes systems and methods for the detection and removal of accumulated frozen precipitate from a vehicle exterior surface, such as an undercarriage, in response to geographic location. The system is configured to automatically remove frozen precipitate from the exterior surface when the vehicle is a pre-determined interval of distance or time from a destination entered in the navigation unit. Use of the system can result in a cleaner garage or other vehicle parking area because snow and ice are removed prior to arrival at the parking area.

The system includes a frozen precipitate removal element in communication with a navigation unit and/or a controller. The navigation unit can be installed in the vehicle (an "on-board navigation unit"). Alternatively, the navigation unit can be a portable/stand-alone navigation unit or a personal electronic device having navigation unit functionality and the capability to communicate with the vehicle or system (an "off-board navigation unit").

When the navigation unit determines that the vehicle is a pre-determined activation distance or time from a set destination, the frozen precipitate removal element is activated, resulting in removal of the frozen precipitate prior to arrival at the destination. The method includes placing a frozen precipitate removal element in direct or indirect communication with a vehicle navigation unit so that the frozen precipitate removal element is activated in response to a position determination by the navigation unit.

As the term is used herein, a "vehicle" can include any land-based motor vehicle such as a car, truck, van, SUV, bus, motorcycle, three-wheeled vehicle, trailer truck, semi-trailer truck, a trailer or semi-trailer, or any other land-based vehicle. In some variations, a vehicle can include an air-based vehicle such as an airplane or helicopter. In such latter variations, the system can be configured to remove frozen precipitate from an undercarriage, such as landing gear, or from any other surface where frozen precipitate can accumulate. In some circumstances, a vehicle can refer particularly to an automobile.

Figure 1:
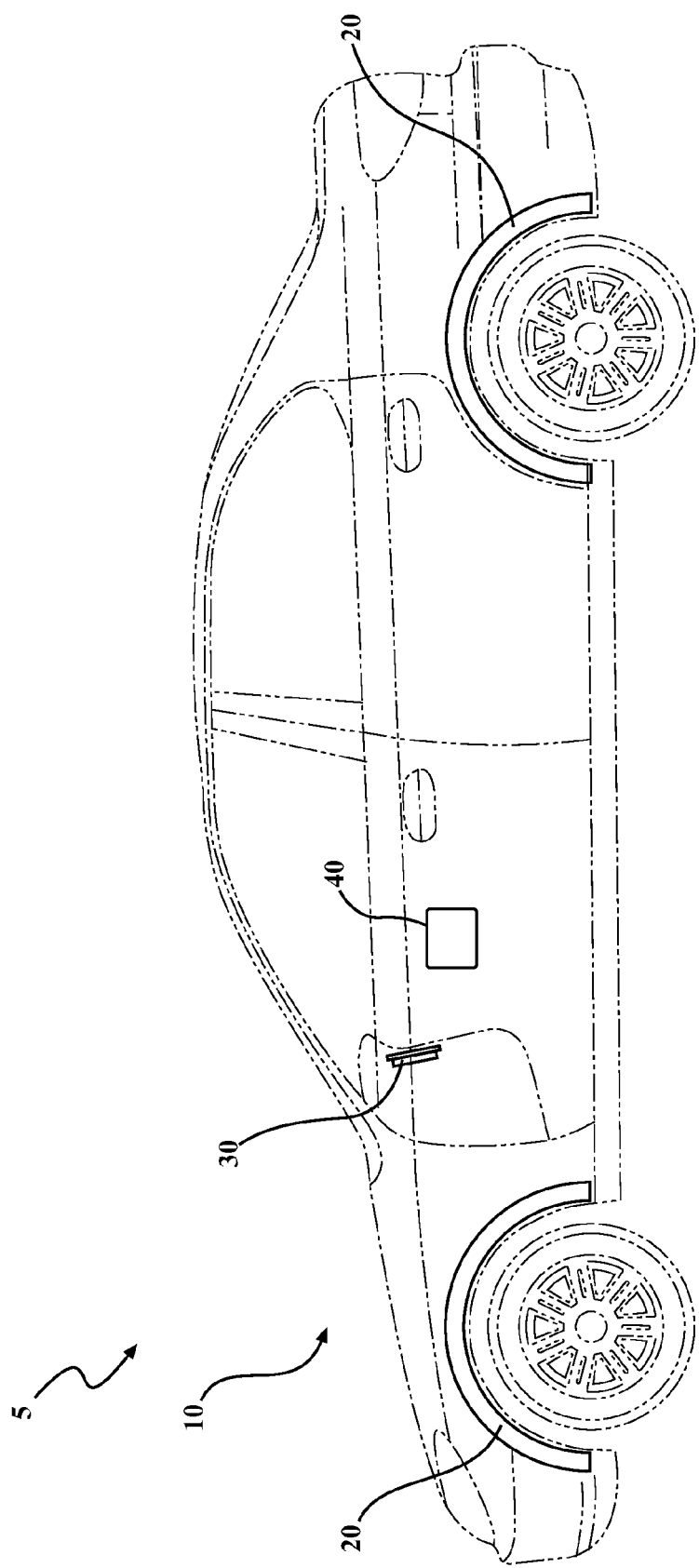
FIG. 1 is a schematic side view of a vehicle having a system for the removal of accumulated frozen precipitate from the vehicle undercarriage in response to geographic location, the system having a frozen precipitate removal element.

Referring now to FIG. 1, an automotive vehicle 5 is shown having a system 10 for removing accumulated frozen precipitate from a vehicle exterior surface in response to geographic location. The phrase "vehicle exterior surface", as used herein, can refer to any exterior surface of a vehicle 5. In some implementations, it can refer more particularly to a vehicle undercarriage, such as an undercarriage of an automobile, other land-based vehicle, or an air-based vehicle. In some implementations, the phrase "vehicle exterior surface" can refer still more particularly to a wheel well of an automobile.

The phrase "accumulated frozen precipitate" as used herein generally refers to a composition that includes a component of frozen water, such as slush, snow, or ice that can accumulate in a wheel well or other regions of the vehicle 5 exterior surface during driving in freezing conditions. The system 10 has at least one frozen precipitate removal element 20. The removal element 20 can be reversibly alternated between a deactivated state and an activated state, and is configured to remove accumulated frozen precipitate from a portion of the vehicle exterior surface when activated, or in the activated state.

The system 10 can additionally have a navigation unit 30, a controller 40, or both. The system 10 is configured to automatically activate the frozen precipitate removal element 20 when the navigation unit 30 determines that the vehicle 5 is within a location-based "activation zone." For brevity, a frozen precipitate removal element 20 will be alternatively referred to herein as a "removal element."

Generally, the removal element 20 and the navigation unit 30 will be in electrical (i.e. wired) or electromagnetic (i.e. wireless) communication with one another. Such communication can be direct or indirect. In instances where communication is indirect, the removal element 20 and the navigation unit 30 can be in communication with one another via the controller 40. In such instances, the controller 40 can be configured to receive data from the navigation unit 30, the data pertaining to a current destination arrival interval. The controller 40 can be further configured to determine whether the current destination arrival interval is less than a pre-determined activation point. The controller can further be configured to transmit instructions directing activation of the removal element if the current destination arrival interval is less than the pre-determined activation point.

Generally, the activation zone is defined at least in part by a pre-determined activation point. The pre-determined activation point can be any of a pre-determined activation distance and a pre-determined activation time. When the navigation unit 30 and/or the controller 40 determines that a current driving distance to a destination is less than a pre-determined activation distance, or that a current driving time to the destination is less than a pre-determined activation time, this can result in automatic activation of the removal element 20. As a group, a current driving time to the destination, and a current driving distance to the destination can be referred to as a "current destination arrival interval."

In some implementations, the activation zone can be further defined at least in part by a pre-determined deactivation point. The pre-determined deactivation point can be any of a pre-determined deactivation distance and a pre-determined deactivation time. When the navigation unit 30 determines a current driving distance to the destination that is less than a pre-determined deactivation distance, or a current driving time to the destination that is less than a pre-determined deactivation time, this can result in automatic deactivation of the removal element 20. Thus, in implementations in which a pre-determined deactivation point is employed, the activation zone is generally defined by a current driving distance to the destination that is less than the pre-determined activation distance and greater than the pre-determined deactivation distance; or by a current driving time to the destination that is less than the pre-determined activation time and greater than the pre-determined deactivation time.

Figure 2A:
FIG. 2A is a schematic view of a navigation unit display, in which the vehicle is approaching a pre-determined activation distance from its destination.

For example, and in reference to FIGS. 2A, 2B, 3A and 3B, a user of the system 10 can have an option to choose a pre-determined activation distance, such as 5 miles, sufficient to allow removal of all accumulated frozen precipitate prior to arrival at the destination (or at the pre-determined deactivation distance). FIG. 2A shows a navigation unit 30 display is shown for a vehicle that is approaching an activation distance of 5 miles (X=5 miles). Just prior to reaching the pre-determined activation distance of 5 miles, accumulated frozen precipitate 52 is present in the wheel wells and the removal element 20 is in a deactivated state 20A.

It should be understood that the pre-determined activation distance will generally be a driving distance along a route that the navigation unit has applied, rather than a direct, linear distance.

Figure 2B:
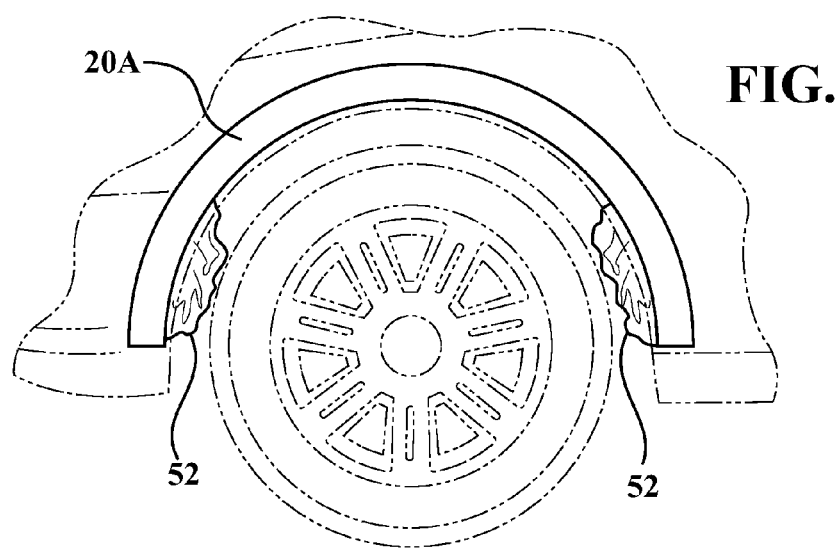
FIG. 2B is a close-up schematic side view of a wheel well portion of the vehicle of FIG. 2A having frozen precipitate in contact with a frozen precipitate removal element that is not activated.
Figure 3A:
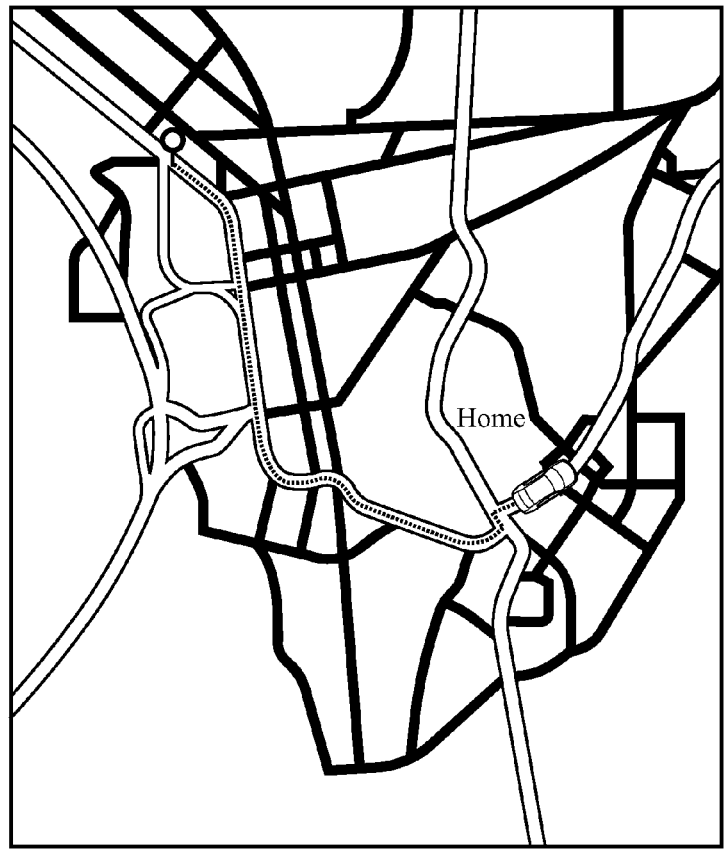
FIG. 3A is a schematic view of the navigation unit display of FIG. 3A, in which the vehicle is approaching its destination.
Figure 3B:
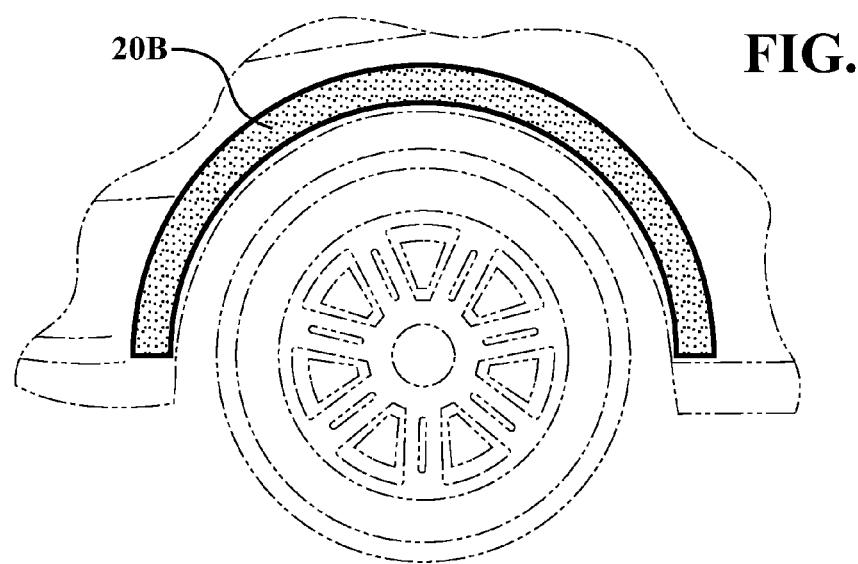
FIG. 3B is a close-up schematic side view of a wheel well portion of the vehicle of FIG. 4A in which the frozen precipitate removal element is activated in response to a signal derived from the vehicle's navigation unit.
Figure 4A:
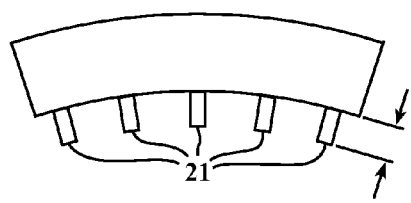
FIG. 4A is a schematic view of a mechanical protrusion element type of frozen precipitate removal element.
Figure 4B:
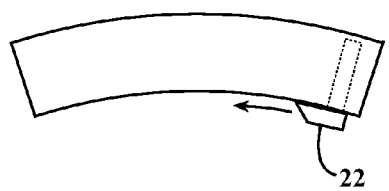
FIG. 4B is a schematic view of a mechanical abrasion type of frozen removal element of frozen precipitate removal element.
Figure 4C:
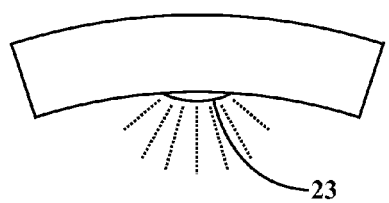
FIG. 4C is a schematic view of a freezing point lowering type of frozen precipitate removal element.
Figure 4D:
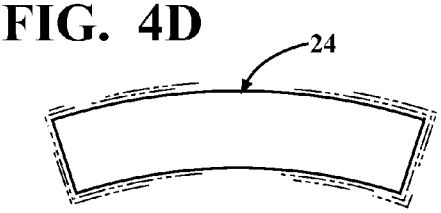
FIG. 4D is a schematic view of an acoustic type of frozen precipitate removal element.
Figure 4E:
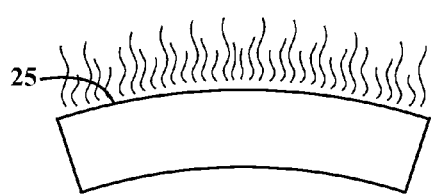
FIG. 4E is a schematic view of a conductive heating type of frozen precipitate removal element.
Figure 4F:
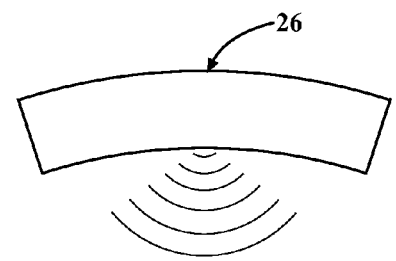
FIG. 4F is a schematic view of a radiative type of frozen precipitate removal element.

As the vehicle 5 comes within 5 miles of driving distance of the destination as determined by the navigation unit 30, the removal element 20 is automatically activated, or caused to be present in an activated state 20B. FIG. 2A shows the navigation unit 30 display of the vehicle 5 as it imminently approaches HOME, and frozen precipitate has been removed from the wheel well as shown in FIG. 2B. In this example, no deactivation point is employed and so the removal element 20 remains in an activated state 20B until the vehicle is turned off at HOME. As mentioned above, in some implementations a deactivation point can optionally be selected such that, for example, the removal element 20 returns to a deactivated state 20A when the vehicle reaches a distance less than 0.5 miles from HOME.

As noted, a current driving distance to the destination, activation distance, and deactivation distance can be replaced with a current driving time to the destination, activation time, and deactivation time. In such implementations, driving time to a destination can be determined, for example, as a product of driving distance and average speed limit.

A navigation unit 30, as described herein, can include any device or combination of devices capable of determining a vehicle's driving distance to a destination. In many uses, the navigation unit 30 will be a component of a satellite-based navigation system.

Referring now to FIGS. 4(A-F), non-limiting examples of devices that can be suitably used as removal elements 20 include mechanical protrusion elements 21, mechanical abrasion elements 22, freezing point lowering elements, 23, vibrational removal elements 24, conductive heating elements 25, and radiative elements 26.

A mechanical protrusion element 21 (FIG. 4A) can include one or more rods, plates or other parts which, upon activation, mechanically and temporarily protrude from a portion of the vehicle exterior surface to push frozen precipitate off of the vehicle exterior surface. A mechanical abrasion element 22 (FIG. 4B) can include a moving part that scrapes or otherwise abrades accumulated frozen precipitate from the vehicle exterior surface. A freezing point lowering element 23 (FIG. 4C) can include a dispenser that applies a solvent, solute or solution to the frozen precipitate to lower the freezing point of the frozen precipitate and thereby cause its melting. A non-limiting example can be a sprayer similar to a windshield wash fluid sprayer.

A vibrational removal element 24 (FIG. 4D) can include any device that vibrates or emits acoustic waves. A conductive heating element 25 (FIG. 4E) can include a resistive heating element or in some cases an induction heating element. A radiative element 26 (FIG. 4F) can emit electromagnetic radiation such as IR or microwaves at a frequency configured to be absorbed by water, causing vibrational or rotational excitation of water molecules and thereby causing frozen precipitate to melt.

The aforementioned, exemplary types of suitable removal elements 20 can be categorized into three groups: thermal elements (including radiative elements 26 and conductive heating elements 25), mechanized elements (including mechanical protrusion elements 21, mechanical abrasion elements 22, and vibrational removal elements 24), and chemical (including freezing point lowering elements 23). It should be appreciated that these groups of removal element 20, including their various examples, can be used in combination with one another, and/or that an individual removal element 20 can simultaneously constitute more than one of the aforementioned types. To take an obvious example of the latter, a conductive heating element 25 will typically also be partially a radiative element 26 that incidentally emits IR and other electromagnetic radiation.

It is to be appreciated that in implementations of a system 10 that include one or more removal elements 20 that are mechanized elements or chemical elements, the system 10 can be adapted for the removal of dirt, mud, or other debris from a vehicle 5 exterior surface. For example, and in partial reference to FIG. 2B, the accumulated frozen precipitate 52 can instead be accumulated debris such as dirt or mud. Removal elements 20 that are mechanical elements or chemical elements can be used to remove such accumulated debris. In such implementations having a chemical element, the chemical element can be a dispenser of pressurized or high velocity fluid, such as a cleaning solution. The entirety of the present disclosure describes such implementations of the system 10, by replacement of the phrase "frozen precipitate" with the term "debris".

A removal element 20 will typically be positioned on the vehicle exterior surface, or at a location where it is effective to remove frozen precipitate from the vehicle exterior surface. In some particular implementations, such as in FIG. 1, a removal element 20 will be positioned in a wheel well or other portion of an undercarriage, or at a location where it is effective to remove frozen precipitate from a wheel well or other portion of an undercarriage.

It should be appreciated that activation of the removal element 20 while the vehicle 5 is within the activation zone can be continuous, but need not necessarily be so. For example, the removal element 20 can be activated at periodic intervals while the vehicle 5 is within the activation zone.

Also disclosed is a method for detecting and removing accumulated frozen precipitate 52 from a portion of a vehicle exterior surface in response to geographic location of the vehicle. The method includes a step of determining a current destination arrival interval of the vehicle to a destination. The method additionally includes a step of activating a removal element 20 when the driving interval is less than a pre-determined activation point. In some implementations, the method can include an additional step of deactivating the removal element 20 when the measured current driving interval is less than a pre-determined deactivation point. In such implementations, the deactivation distance will typically be smaller than the activation distance. In every instance where an equivalent term or phrase is used to describe the method as has been used to describe the system 10, that term or phrase has the same meaning in relation to the method as its meaning in relation to the system 10.

The measuring step as described above will typically be automatically performed by a vehicle navigation unit 30 and/or a controller 40, as described above. In many implementations, the navigation unit 30 will be a component of a navigation system that communicates with a global positioning satellite.

It is to be understood that the phrases "less than" and "greater than" as used herein can be replaced respectively with the phrases "less than or equal to" and "greater than or equal to".

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment is included in at least one embodiment or aspect. The appearances of the phrase "in one aspect" (or variations thereof) are not necessarily referring to the same aspect or embodiment.

What is claimed is:

1. A system for removing frozen precipitate from a vehicle exterior surface, comprising:
   a navigation unit configured to calculate a current destination arrival interval of the vehicle; and
   a removal element, configured to remove accumulated frozen precipitate from at least a portion of the exterior surface, the removal element in communication with the navigation unit,
   wherein the removal element is automatically activated when the current destination arrival interval is less than a pre-determined activation point.

2. The system as recited in claim 1, further comprising a controller configured to:
   receive data from a navigation unit pertaining to the current destination arrival interval;
   determine whether the current destination arrival interval is less than the pre-determined activation point; and
   transmit instructions directing activation of the removal element if the current destination arrival interval is less than the pre-determined activation point.

3. The system as recited in claim 1, wherein the removal element is automatically deactivated when the current destination arrival interval is less than a pre-determined deactivation point.

4. The system as recited in claim 1, wherein the current destination arrival interval is a current driving distance to a destination and the pre-determined activation point is a pre-determined driving distance to the destination.

5. The system as recited in claim 1, wherein the current destination arrival interval is a current driving time to a destination and the pre-determined activation point is a pre-determined driving time to the destination.

6. The system as recited in claim 1, wherein the removal element comprises any of a radiative element, a conductive heating element, a vibrational removal element, a freezing point lowering element, a mechanical abrasion element, and a mechanical protrusion element.

7. The system as recited in claim 1, wherein the removal element is located in a wheel well of the vehicle.

8. A method for removing accumulated frozen precipitate from a vehicle exterior surface, the method comprising:
   determining a current destination arrival interval of the vehicle; and
   activating a removal element when the current destination arrival interval is less than a pre-determined activation point,
   wherein the removal element is configured to remove accumulated frozen precipitate from a portion of the vehicle exterior surface when activated, and wherein the current destination arrival interval is a current driving distance to the destination or a current driving time to the destination, and the pre-determined activation point is a pre-determined distance or a pre-determined time, respectively.

9. The method as recited in claim 8, further comprising:
   deactivating the removal element when the current destination arrival interval is less than a pre-determined deactivation point.

10. The method as recited in claim 8, wherein the determining step is performed by a navigation unit in communication with a global positioning system satellite.

11. The method as recited in claim 8, wherein the removal element comprises any of a radiative element, a conductive heating element, a vibrational removal element, a freezing point lowering element, a mechanical abrasion element, and a mechanical protrusion element.

12. A system for removing frozen precipitate from a vehicle exterior surface, comprising:
    a removal element configured to, when activated, remove accumulated frozen precipitate from a portion of the vehicle exterior surface; and
    a controller configured to:
      receive data from a navigation unit, the data pertaining to a current destination arrival interval;
      determine whether the current destination arrival interval is less than a pre-determined activation point; and
      transmit instructions directing activation of the removal element if the current destination arrival interval is less than the pre-determined activation point.

13. The system as recited in claim 12, wherein the removal element is automatically deactivated when the current destination interval is less than a pre-determined deactivation point.

14. The system as recited in claim 12, wherein the removal element comprises any of a radiative element, a conductive heating element, a vibrational removal element, a freezing point lowering element, a mechanical abrasion element, and a mechanical protrusion element.

15. The system as recited in claim 12, wherein the removal element is automatically deactivated when the current destination arrival interval is less than a pre-determined deactivation point.

16. The system as recited in claim 12, wherein the current destination arrival interval is a current driving distance to a destination and the pre-determined activation point is a pre-determined driving distance to the destination.

17. The system as recited in claim 12, wherein the current destination arrival interval is a current driving time to a destination and the pre-determined activation point is a pre-determined driving time to the destination.

18. The system as recited in claim 12, wherein the removal element is located in a wheel well of the vehicle.

19. The system as recited in claim 12, wherein the navigation unit is an on-board vehicle navigation unit.

20. The system as recited in claim 12, wherein the navigation unit is an off-board navigation unit.

21. A system for removing accumulated debris from a vehicle exterior surface, comprising:
    a navigation unit configured to calculate a current destination arrival interval of the vehicle; and
    a removal element, configured to remove accumulated debris from at least a portion of the exterior surface, the removal element in communication with the navigation unit,
    wherein the removal element is automatically activated when the current destination arrival interval is less than a pre-determined activation point.

* * * * *